United States Patent
Yoshinami

(10) Patent No.: US 8,403,646 B2
(45) Date of Patent: Mar. 26, 2013

(54) OIL PUMP SYSTEM FOR VEHICLE

(75) Inventor: Koudi Yoshinami, Kariya (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 991 days.

(21) Appl. No.: 12/153,346

(22) Filed: May 16, 2008

(65) Prior Publication Data

US 2008/0286123 A1   Nov. 20, 2008

(30) Foreign Application Priority Data

May 17, 2007   (JP) ................................ P2007-131911

(51) Int. Cl.
*F04B 41/06* (2006.01)
(52) U.S. Cl. ........................................... 417/2; 417/286
(58) Field of Classification Search ................. 418/268, 418/269, 75, 81, 82, 256, 259; 417/2, 286, 417/287, 288
See application file for complete search history.

(56) References Cited

U.S. PATENT DOCUMENTS

| | | | | |
|---|---|---|---|---|
| 5,026,263 A * | 6/1991 | Iwata | ............................... | 418/82 |
| 5,474,428 A * | 12/1995 | Kimura et al. | .................. | 417/16 |
| 6,390,947 B1 * | 5/2002 | Aoki et al. | ........................ | 477/3 |
| 6,579,070 B1 * | 6/2003 | Birkenmaier et al. | ........ | 417/216 |

FOREIGN PATENT DOCUMENTS

| | | |
|---|---|---|
| DE | 10 2006 036 756 A1 | 2/2008 |
| JP | 2000-18377 | 1/2000 |
| JP | 2000-313252 | 11/2000 |
| JP | 2002-115755 | 4/2002 |
| JP | 2002-371969 | 12/2002 |
| WO | WO 2006/099947 A1 | 9/2006 |

OTHER PUBLICATIONS

European search report dated Aug. 18, 2008.

* cited by examiner

*Primary Examiner* — Peter J Bertheaud
*Assistant Examiner* — Dnyanesh Kasture
(74) *Attorney, Agent, or Firm* — McGinn IP Law Group, PLLC

(57) ABSTRACT

An oil pump system for a vehicle includes: a vane pump having a plurality of vanes which respectively project retractably from a plurality of vane accommodating grooves provided in a rotor so as to be brought into sliding contact with a cam surface, the vane pump being adapted to supply a hydraulic fluid to an automatic transmission; an electric power-driven oil pump for assisting the hydraulic pressure of the hydraulic fluid during an idling stop of the automobile; and an ECU for controlling its operation. During an idling stop, the hydraulic fluid is fed to the automatic transmission by the operation of the electric power-driven oil pump to assist the hydraulic pressure, while the hydraulic fluid is fed with pressure also to the vane accommodating grooves to press the vanes against the cam surface.

10 Claims, 6 Drawing Sheets

OIL PUMP SYSTEM FOR VEHICLE

BACKGROUND OF THE INVENTION

1. Field of the Invention

The present invention relates to an oil pump system for a vehicle having a vane pump for supplying a hydraulic fluid to an external hydraulic actuator so as to serve as a hydraulic power source for the hydraulic actuator. More particularly, the present invention concerns an oil pump system for a vehicle having a vane pump for supplying a hydraulic fluid to a hydraulic actuator of an automatic transmission or the like provided in a vehicle such as an automobile, so as to serve as a generating source for the hydraulic actuator.

2. Related Art

A vehicle such as an automobile is provided with an oil pump system for a vehicle which includes a hydraulic pump for supplying a hydraulic fluid to a hydraulic actuator of an automatic transmission or the like provided in a vehicle such as an automobile so as to serve as a generating source of hydraulic pressure required for the hydraulic actuator, as well as a controller for controlling the operation of the hydraulic pump.

To described an example of a system which is provided in an automobile having an automatic transmission among the oil pump systems for a vehicle, referring to FIG. 6, the oil pump system for a vehicle is comprised of a hydraulic pump 5 which is driven by the torque of a rotating shaft (crankshaft) of an engine 50 and is adapted to supply to an automatic transmission 51 a hydraulic fluid for its speed ratio control through a piping with a check valve 7b provided therein. This system is further comprised of an electric power-driven oil pump (electric power-driven assist pump) 10 which is made up of a pump 12 and an electric motor 13 for driving the pump 12, so as to assist the hydraulic pressure of the hydraulic fluid during an idling stop of the automobile through a piping with a check valve 7b provided therein on the basis of a command from an engine control unit (ECU) 4 serving as the controller. This oil pump system for a vehicle is further comprised of a relief valve 7r disposed between a discharge portion of the pump 12 and the check valve 7b and adapted to relieve the hydraulic fluid into a drain when the discharge pressure of the electric power-driven oil pump 10 has assumed an overpressure state. Each of the hydraulic pump 5 and the electric power-driven oil pump 10 is adapted to suck the hydraulic fluid stored in an oil pan 52 provided below the engine 50 and supply (force feed) it to the automatic transmission 51.

As the hydraulic pump 5 of this type, a so-called vane pump, which is a kind of rotary volumetric pump, is frequently used since although it has a compact and simple structure, it has excellent characteristics of large capacity, low noise, and low pulsation (refer to JP-A-2000-18377).

The aforementioned vane pump, although not shown, includes a rotor, a plurality of vanes projecting retractably from a plurality of vane accommodating grooves provided in the rotor, and an elliptical cam ring surrounding the rotor. Further, as the rotor is rotated inside the cam ring, the vanes are adapted to project by the action of the centrifugal force due to the rotation of the rotor and by the hydraulic pressure on the discharge side of the vane pump so as to slide on a cam surface at the inner surface of the cam ring. At this time, a plurality of pump chambers, which are partitioned by the vanes and accommodate the hydraulic fluid, are formed between an outer periphery of the rotor and the cam surface. Among the pump chambers, those whose volume is large become high-pressure portions where the hydraulic fluid is set under high pressure, while those whose volume is small become low-pressure portions where the hydraulic fluid is set under low pressure.

Then, the hydraulic fluid is sucked from the oil pan 52 by the low-pressure portions, and the sucked hydraulic fluid is fed with pressure to the automatic transmission 51 by the high-pressure portions.

In addition, in the electric power-driven oil pump 10, in a rotation range of the engine 50 at an idling speed Na or below, the number of revolution of the electric motor 13 is controlled by the ECU 4, such that a total discharge rate, which is a total of a discharge rate of the vane pump and a discharge rate (auxiliary flow rate) of the electric power-driven oil pump 10, becomes a fixed rate irrespective of an engine speed (rotational speed of a rotating shaft of the engine 50).

However, in such an automobile, at the point of time when the automobile is started by starting again the rotation of the engine 50 from a standstill state, i.e., from the idling stop state with the rotation of the engine once stopped, the rotor does not rotate in the vane pump, and the vanes are in a state of being not in contact with the cam surface of the cam ring. For this reason, the hydraulic fluid is not sealed in the pump chambers formed by the plurality of vanes between the outer periphery of the rotor and the cam surface, and the low-pressure portions and the high-pressure portions are not formed, so that the hydraulic fluid is not in a state of being fed with pressure to the automatic transmission 51 of the automobile.

For this reason, conventionally, referring to FIG. 5, when the engine 50 is started from the idling stop state, there occurred an engine rotation range (the range of an engine speed N=0 to No (min$^{-1}$) in FIG. 5) where, despite the above-described number-of-revolution control of the electric motor 13 by the ECU 4, a total discharge rate QT' (=Qa+Qb') (m$^3$/min) does not become a fixed rate, and a flow rate Q of the hydraulic fluid supplied from the vane pump to the automatic transmission 51 is lower than a required flow rate Qn. Namely, the discharge rate Qb' of the conventional vane pump exhibits a downwardly convex curve in the engine rotation range, and a power loss (corresponding to the area of $S_0$ in FIG. 5) conventionally occurred. There have been cases where this power loss constitutes a hindrance to the smooth starting of the automobile. This also leads to a decline in the reliability of the vane pump as the hydraulic pump 5 for an automobile.

It should be noted that it is not preferable to make a large-scale structural change in the oil pump system for a vehicle to overcome the above-described problem of a hydraulic pressure shortage of the hydraulic fluid which is fed from the vane pump to the automatic transmission 51 during the starting of the engine 50, since this correspondingly requires a change in the manufacturing process of the automobile and results in an increase in the number of parts used.

SUMMARY OF THE INVENTION

The invention has been devised to overcome the above-described problems, and its object is to provide an oil pump system for a vehicle which allows the vehicle to be started smoothly when the engine is started from an idling stop state, without making a large structural change from a conventional oil pump system for a vehicle.

To attain the above object, in accordance with a first aspect of the invention there is provided an oil pump system for a vehicle comprising: a vane pump having a plurality of vanes which respectively project retractably from a plurality of vane accommodating grooves provided in a rotor so as to be brought into sliding contact with a cam surface, low-pressure portions for sucking a hydraulic fluid from an outside and high-pressure portions for discharging the hydraulic fluid to the outside being adapted to be produced in pump chambers formed by the plurality of vanes between the cam surface and the rotor by the rotation of the rotor so as to supply the hydraulic fluid to a transmission of a vehicle, in order to serve as a hydraulic power source for the transmission of the vehicle; an electric power-driven oil pump for assisting hydraulic pressure of the hydraulic fluid during an idling stop of the vehicle; and a controller for controlling an operation of the electric power-driven oil pump, wherein, during the idling stop of the vehicle, the hydraulic fluid is fed to the transmission by the operation of the electric power-driven oil pump to assist the hydraulic pressure, while the hydraulic fluid is fed with pressure to the vane accommodating grooves to press the vanes against the cam surface.

According to the above-described first aspect of the invention, during an idling stop of the automobile, the hydraulic fluid is fed with pressure to the vane accommodating grooves accommodating the vanes in the vane pump, which serves as the hydraulic pump, by the operation of the electric power-driven oil pump assisting the hydraulic pressure of the transmission during the idling stop, so that the vanes are projected and are pressed against the cam surface. For this reason, immediately upon the start of the engine 50, the start of the vane pump, the low-pressure portions and the high-pressure portions are formed in the pump chambers between the outer periphery of the rotor and the cam surface, so that the hydraulic fluid is fed with pressure to the transmission.

In accordance with a second aspect of the invention, in the oil pump system for a vehicle according to the first aspect of the invention, a communication oil passage is provided for allowing a discharge side of the electric power-driven oil pump and the vane accommodating grooves of the vane pump to communicate with each other, and a check valve is interposed in the communication oil passage, the check valve being opened when the hydraulic pressure of the hydraulic fluid delivered from the electric power-driven oil pump exceeds the hydraulic pressure of the hydraulic fluid in the vane accommodating grooves.

According to the above-described second aspect of the invention, the check valve, which opens when the hydraulic pressure of the hydraulic fluid delivered from the electric power-driven oil pump exceeds the hydraulic pressure of the hydraulic fluid in the vane accommodating grooves, is interposed in the communication oil passage allowing the discharge portion of the electric power-driven oil pump and the vane accommodating grooves in the vane pump to communicate with each other. For this reason, the check valve is closed by a simple configuration when the hydraulic pressure of the hydraulic fluid in the vane accommodating grooves exceeds the hydraulic pressure of the hydraulic fluid delivered from the electric power-driven oil pump. This avoids the trouble that, for example, a hindrance is caused to the rotation of the rotor in a case where the vane accommodating grooves have assumed an overpressure state, and the pressing force with which the vanes press the cam surface has become excessively large.

In accordance with a third aspect of the invention, in the oil pump system for a vehicle according to the first or second aspect of the invention, the electric power-driven oil pump has an internal gear pump and an electric motor for rotationally driving the pump, and the number of revolution of the electric motor is controlled by the controller.

According to the above-described third aspect of the invention, since the electric power-driven oil pump consists of the internal gear pump and the electric motor for rotationally driving the pump, it is possible to realize an oil pump system for a vehicle which excels in the constant flow rate characteristic and in which the pulsation is small, with the result that the noise during operation is small.

According to the oil pump system for a vehicle in accordance with the invention, it becomes possible to smoothly start the vehicle when the engine is started from an idling stop state, without making a large structural change from a conventional oil pump system for a vehicle.

DETAILED DESCRIPTION OF THE PREFERRED EMBODIMENTS

Referring now to the accompanying drawings, a description will be given of an embodiment of the invention.

Figure 1:
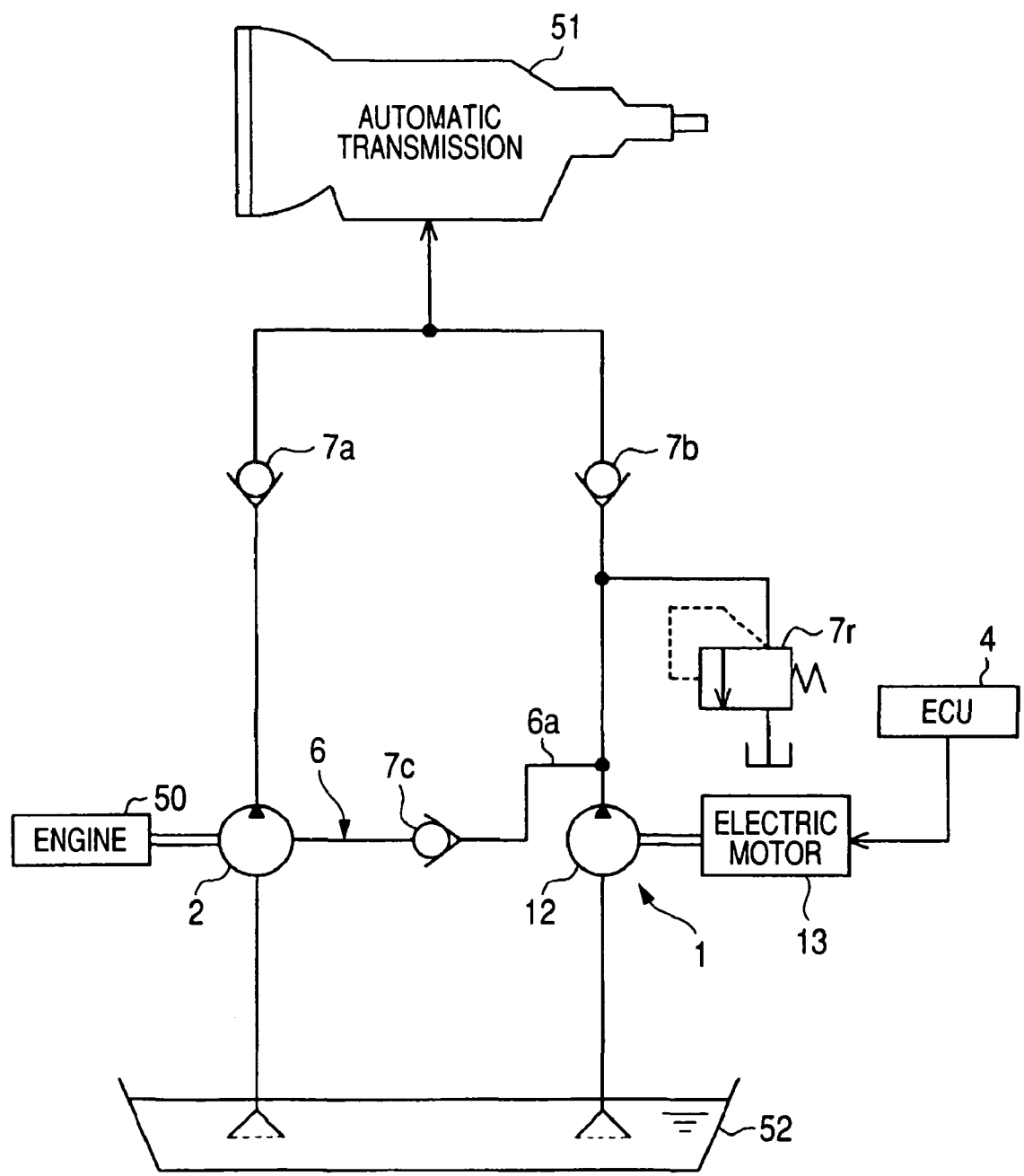
FIG. 1 is a hydraulic circuit diagram of an oil pump system for a vehicle in accordance with an embodiment of the invention.

As shown in FIG. 1, the oil pump system for a vehicle in accordance with this embodiment is provided in an automobile having an automatic transmission.

The oil pump system for a vehicle is comprised of a vane pump (hydraulic pump) 2 which is driven by the torque of a rotating shaft (crankshaft) (not shown) of an engine 50 and is adapted to supply to an automatic transmission 51 a hydraulic fluid for its operation (control) through a piping with a check valve 7a provided therein; and an electric power-driven oil pump (electric power-driven assist pump) 1 which is made up of an internal gear pump (pump) 12 and an electric motor 13 for driving the internal gear pump 12, so as to assist the hydraulic pressure of the hydraulic fluid during an idling stop of the automobile through a piping with a check valve 7b provided therein on the basis of a command from an ECU 4 serving as a controller.

This oil pump system for a vehicle is further comprised of a relief valve 7r disposed between a discharge portion of the internal gear pump 12 and the check valve 7b and adapted to relieve the hydraulic fluid into a drain when the discharge pressure of the electric power-driven oil pump 1 has assumed an overpressure state. Each of the hydraulic pump 2 and the electric power-driven oil pump 1 is adapted to suck the hydraulic fluid stored in an oil pan 52 provided below the engine 50 and supply (force feed) it to the automatic transmission 51.

In the oil pump system for a vehicle in accordance with this embodiment, referring to FIG. 1, unlike an oil pump system for a vehicle of the conventional art, the discharge side of the electric power-driven oil pump 1 and a vane accommodating groove (not shown in FIG. 1) of the vane pump 2 are communicated with each other through a communication oil passage 6, as will be described later in detail. Moreover, a check valve 7c, which opens when the hydraulic pressure of the hydraulic fluid delivered from the electric power-driven oil pump 1 exceeds the hydraulic pressure of the hydraulic fluid in the aforementioned vane accommodating grooves, is interposed in the communication oil passage 6.

Figure 2:
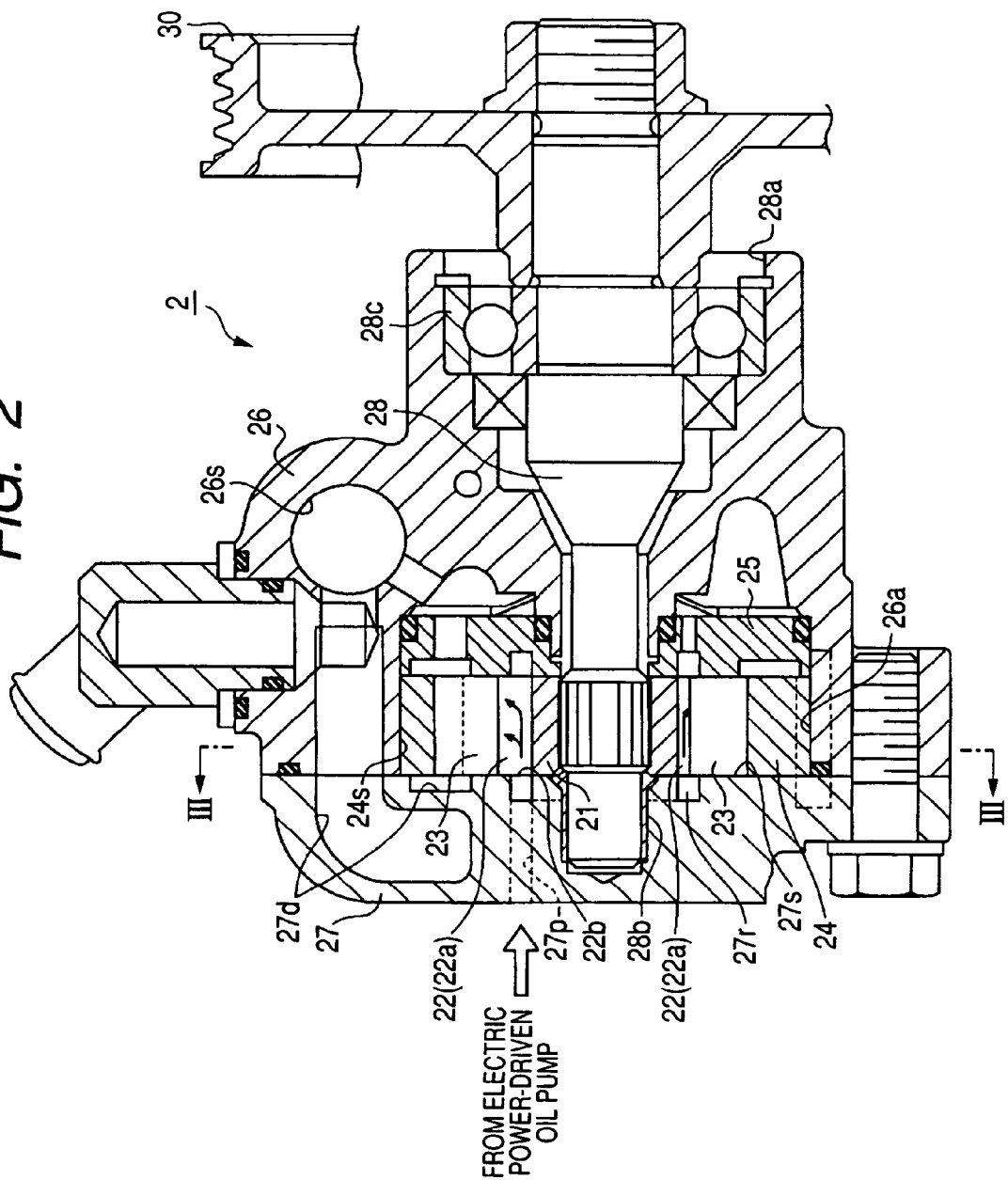
FIG. 2 is an axial cross-sectional view of a vane pump in accordance with the embodiment of the invention.
Figure 3:
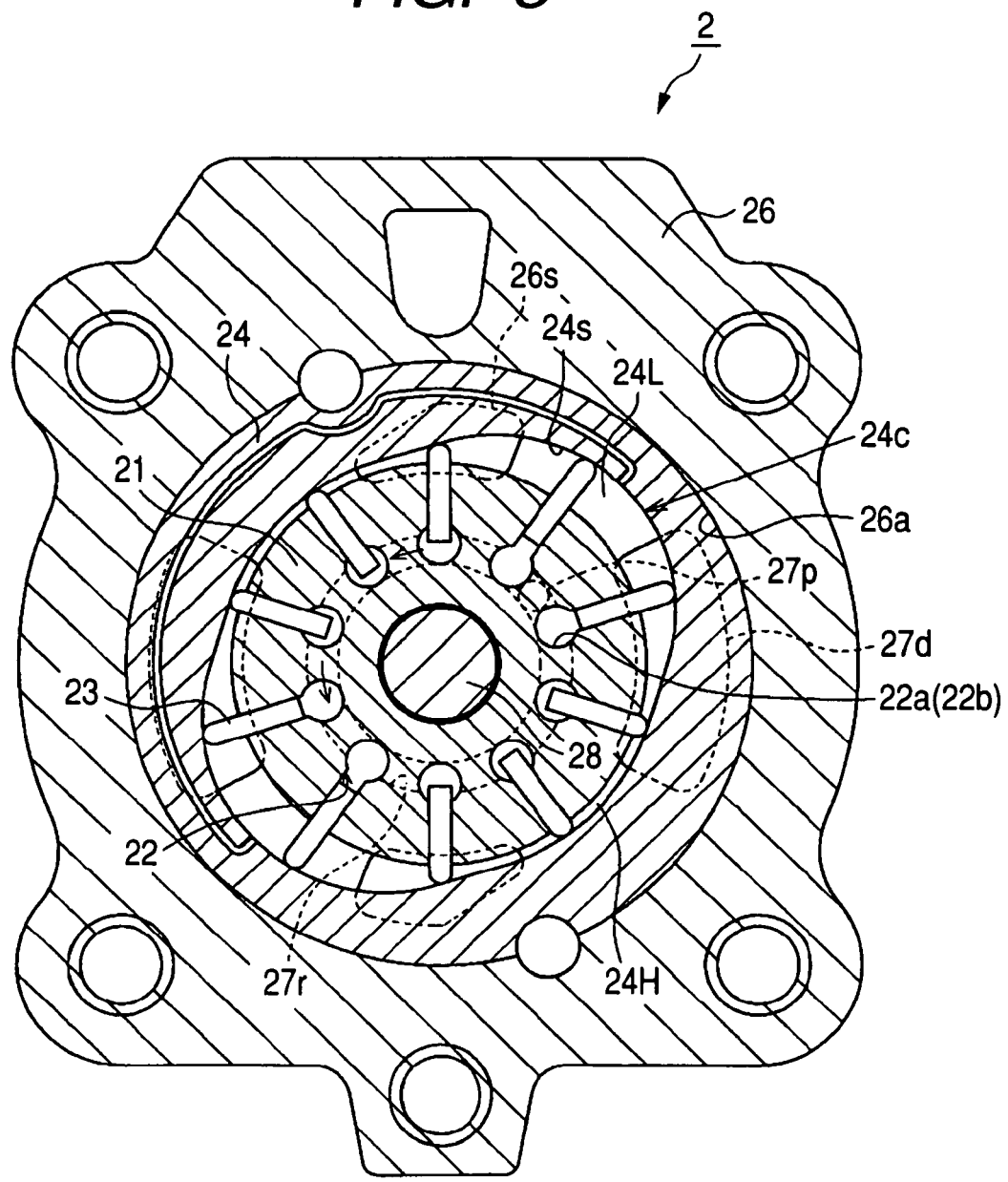
FIG. 3 is a cross-sectional view taken along line III-III in FIG. 2.

As shown in FIGS. 2 and 3, the aforementioned vane pump includes a disk-shaped rotor 21; a plurality of vanes 23 respectively projecting retractably from a plurality of vane accommodating grooves 22 provided recessedly in the rotor 21 so as to extend radially from its inner side toward its outer periphery at substantially equal angular intervals; an elliptical cam ring 24 surrounding the rotor; a housing 26 for accommodating in its inner space 26a the cam ring 24 together with a disk-shaped pressure plate 25 in contact with one side surface thereof; and an end plate 27 which is joined to the housing 26 to close the inner space 26a and sandwich the cam ring 24 from its both side surface in cooperation with the housing 26. Further, the rotor 21 is spline connected to a rotor shaft 28 which is passed through an axial portion of the pressure plate 25 and projects into the inner space 26a.

A pivotal hole 28a, which coaxially communicates with the inner space 26a, is penetratingly formed in the housing 26. In addition, the rotor shaft 28 has one end portion on a pivotal position side of the rotor 21 rotatably supported by a bearing bush 28b fixed to an axial position of the end plate 27 and by a rolling bearing 28c fitted in the pivotal hole 28a, and has its other end portion extended appropriately to an outer side of the pivotal hole 28a. Further, the rotor shaft 28 is operatively connected to a driving source (not shown) of the engine 50 by means of a pulley 30 fitted to this extended end portion. The rotor 21 spline connected to the rotor shaft 28 is adapted to rotate on the inner side of the cam ring 24 by the driving force transmitted from the driving source.

An annular hollow portion 27r, which communicates with respective axial end portions 22b of cylindrical spaces 22a provided in radially inner end portions of the vane accommodating grooves 22 and extending in an axial direction, is provided in a joint surface 27s of the end plate 27 with respect to the cam ring 24. Further, a communication port 27p, which communicates with the annular hollow portion 27r and extends outwardly from a portion thereof to communicate with an external oil passage and the like, is penetratingly formed in the end plate 27.

Further, as the rotor 21 is rotated inside the cam ring 24 by means of the rotor shaft 28, the vanes 23 project by the action of the centrifugal force due to the rotation of the rotor 21 and by the hydraulic pressure on the discharge side of the vane pump 2 so as to slide on a cam surface 24s at the inner surface of the cam ring 24. At this time, referring to FIG. 3, a plurality of pump chambers 24c, which are partitioned by the vanes 23 and accommodate the hydraulic fluid, are formed between an outer periphery of the rotor 21 and the cam surface 24s. Among the pump chambers 24c, those whose volume is large become high-pressure portions 24H where the hydraulic fluid is set under high pressure, while those whose volume is small become low-pressure portions 24L where the hydraulic fluid is set under low pressure. Further, the hydraulic fluid is sucked from an oil pan 52 by the low-pressure portions 24L through a suction port 26s provided in the housing 26, and the sucked hydraulic fluid is fed with pressure to the automatic transmission 51 by the high-pressure portions 24H through a discharge port 27d provided in such a manner as to extend across the end plate 27 and the housing 26.

In addition, in the vane pump 2 of this embodiment, referring to FIGS. 1 to 3, the aforementioned communication oil passage 6 is formed as an oil passage 6a on the discharge side of the electric power-driven pump 1 as well as the annular hollow portion 27r and the communication port 27p both formed in the end plate 27 are communicated with each other. By virtue of this arrangement, during an idling stop of the automobile, the hydraulic fluid is fed with pressure to the vane accommodating grooves 22 of the vane pump 2 through the communication oil passage 6 by the operation of the electric power-driven oil pump 1 assisting the hydraulic pressure of the automatic transmission 51 during the idling stop. Then, the vanes 23 accommodated in the respective vane accommodating grooves 22 are projected radially outward by the pressure oil in the vane accommodating grooves 22, and are pressed against the cam surface 24s at the inner surface of the cam ring 24. Moreover, the check valve 7c (see FIG. 1) interposed in the communication oil passage 6 closes when the hydraulic pressure of the hydraulic fluid in the vane accommodating grooves 22 exceeds the hydraulic pressure of the hydraulic fluid delivered from the electric power-driven oil pump 1. This avoids the trouble that, in a case where the vane accommodating grooves 22 is in an overpressure state, the pressing force with which the vanes 23 press the cam surface 24s becomes excessively large, causing a hindrance to the rotation of the rotor 21.

Figure 4A:
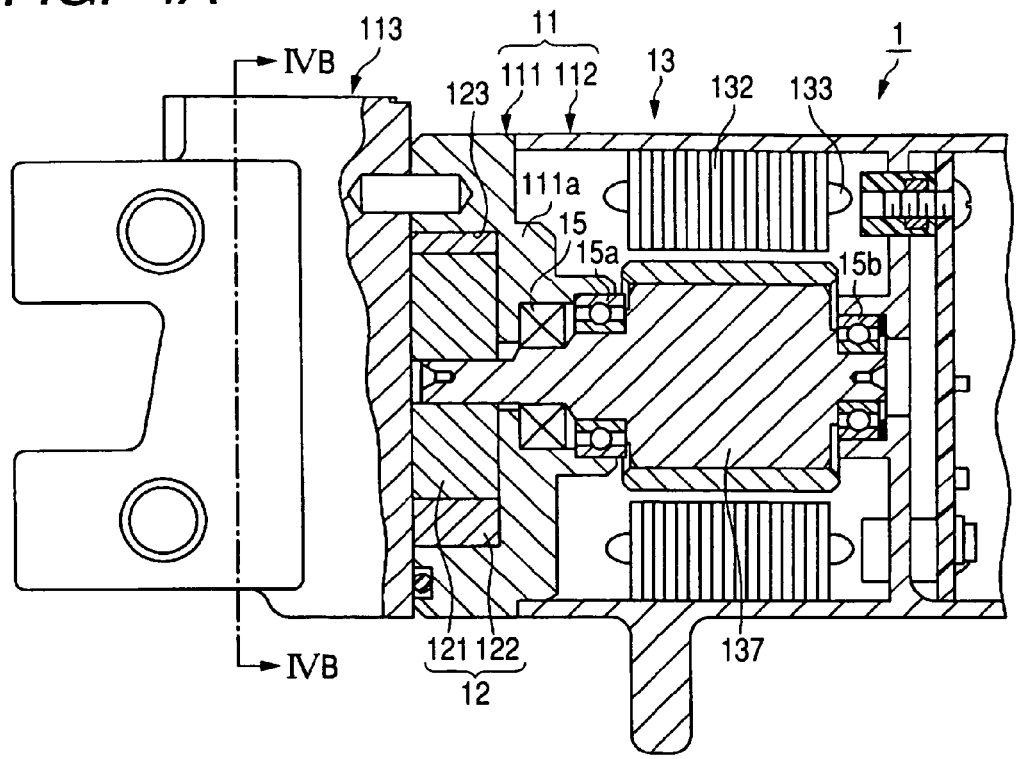
FIG. 4A is an axial cross-sectional view of an electric power-driven oil pump (an internal gear pump and an electric motor) in accordance with the embodiment of the invention.
Figure 4B:
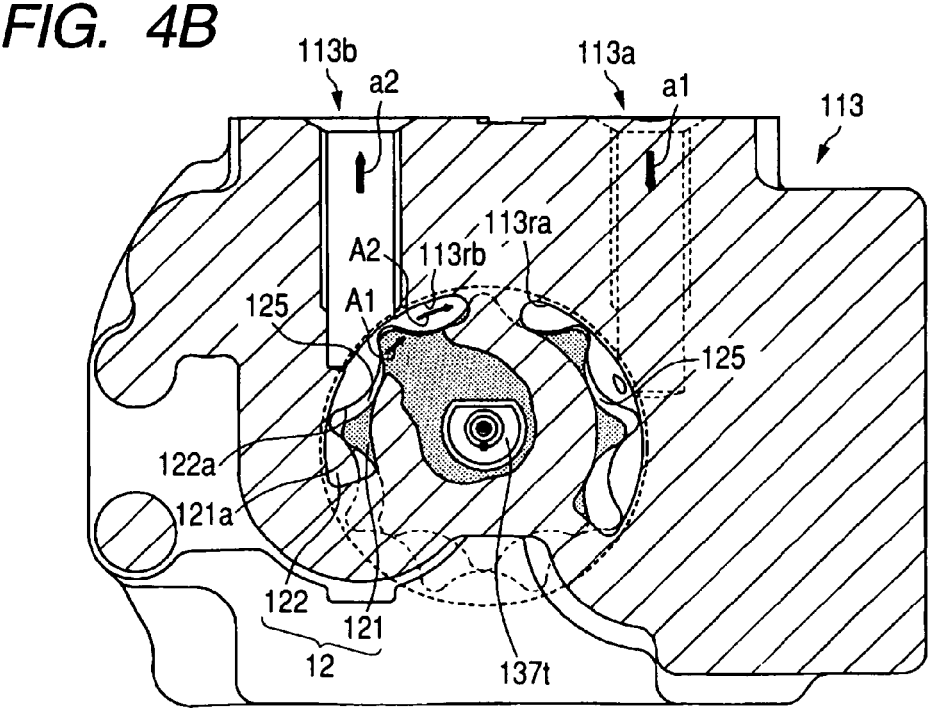
FIG. 4B is a cross-sectional view taken along line IVB-IVB in FIG. 4A.

As shown in FIGS. 4A and 4B, the electric power-driven oil pump 1 has a housing body 11 having an accommodating space in its interior. The housing body 11 consists of a pump housing 111 for accommodating the internal gear pump 12 as well as a motor housing 112 for accommodating the electric motor 13, the motor housing 112 being communicatingly integrated with the pump housing 111.

The internal gear pump 12 includes an inner rotor 121 having inner teeth 121a of the Parachoid (registered tradename) teeth type and an outer rotor 122 having internal teeth 122a of the same teeth type and inscribing and meshing with the inner rotor 121. The internal gear pump 12 sucks and discharges oil by the rotation of the rotors 121 and 122 in the pump housing 111. Here, a cylindrical hollow portion of the pump housing 111 accommodating the inner rotor 121 and the outer rotor 122 is sealed by a pump plate 113 having thickness in the axial direction of the electric motor 13, to thereby form a pump accommodating space 123 for accommodating the internal gear pump 12.

The electric motor 13 has a motor rotor 137 for axially supporting the inner rotor 121 at a leading end portion 137t thereof, as well as a stator core 132 which surrounds the outer periphery of the motor rotor 137 and rotates the motor rotor 137 by the electromagnetic force generated by being made electrically conductive with a coil 133. It should be noted that the motor rotor 137 is rotatably supported by the housing body 11 by means of a first rolling bearing 15a and a second rolling bearing 15b.

The inner rotor 121 and the outer rotor 122 respectively rotate in the directions of arrows A1 and A2. In addition, circular arc-shaped pump chambers 125 are each formed between adjacent ones of the teeth grooves 121a and 122a of the both rotors 121 and 122. In the pump chambers 125, low-pressure portions are formed on the suction side and high-pressure portions are formed on the discharge side in conjunction with the rotation of the both rotors 121 and 122. In addition, in the pump plate 113, a first crescent-shaped port 113ra and a second crescent-shaped port 113rb are formed so as to communicate with the pump chambers 125, and a first port 113a and a second port 113b, which communicate with the respective ports 113ra and 113rb and are connected to external pipings, are further formed.

Further, as the both rotors 121 and 122 rotate, the hydraulic fluid is sucked in the first port 113a in the direction a1, and the hydraulic fluid is discharged from the second port 113b in the direction a2, so that the fluid is fed to the automatic transmission 51 and the vane accommodating grooves 22 of the vane pump 2.

Figure 5:
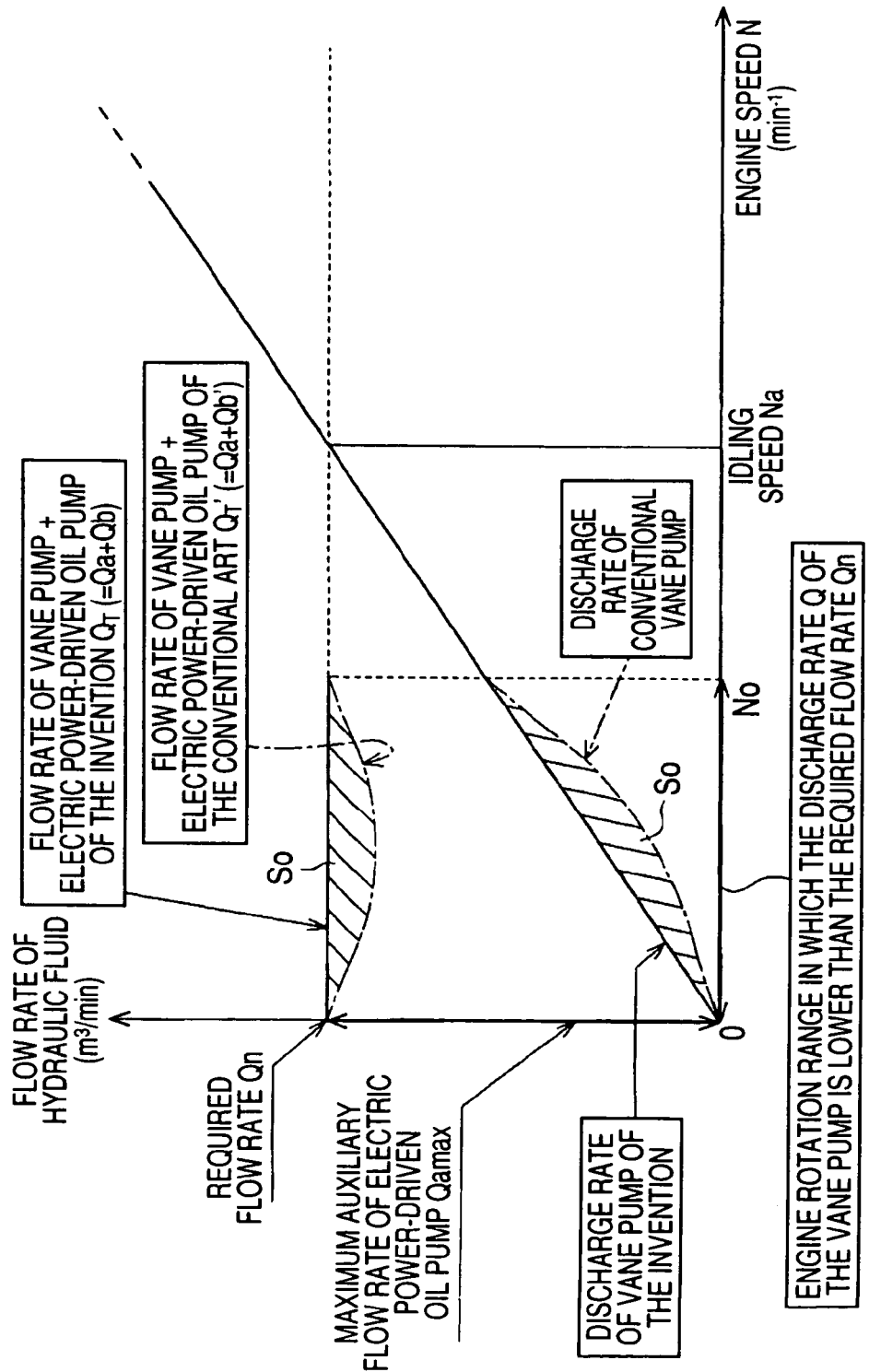
FIG. 5 is a diagram illustrating a relationship between an engine speed N and a flow rate Q of a hydraulic fluid supplied to an automatic transmission in accordance with a conventional example and the invention.
Figure 6:
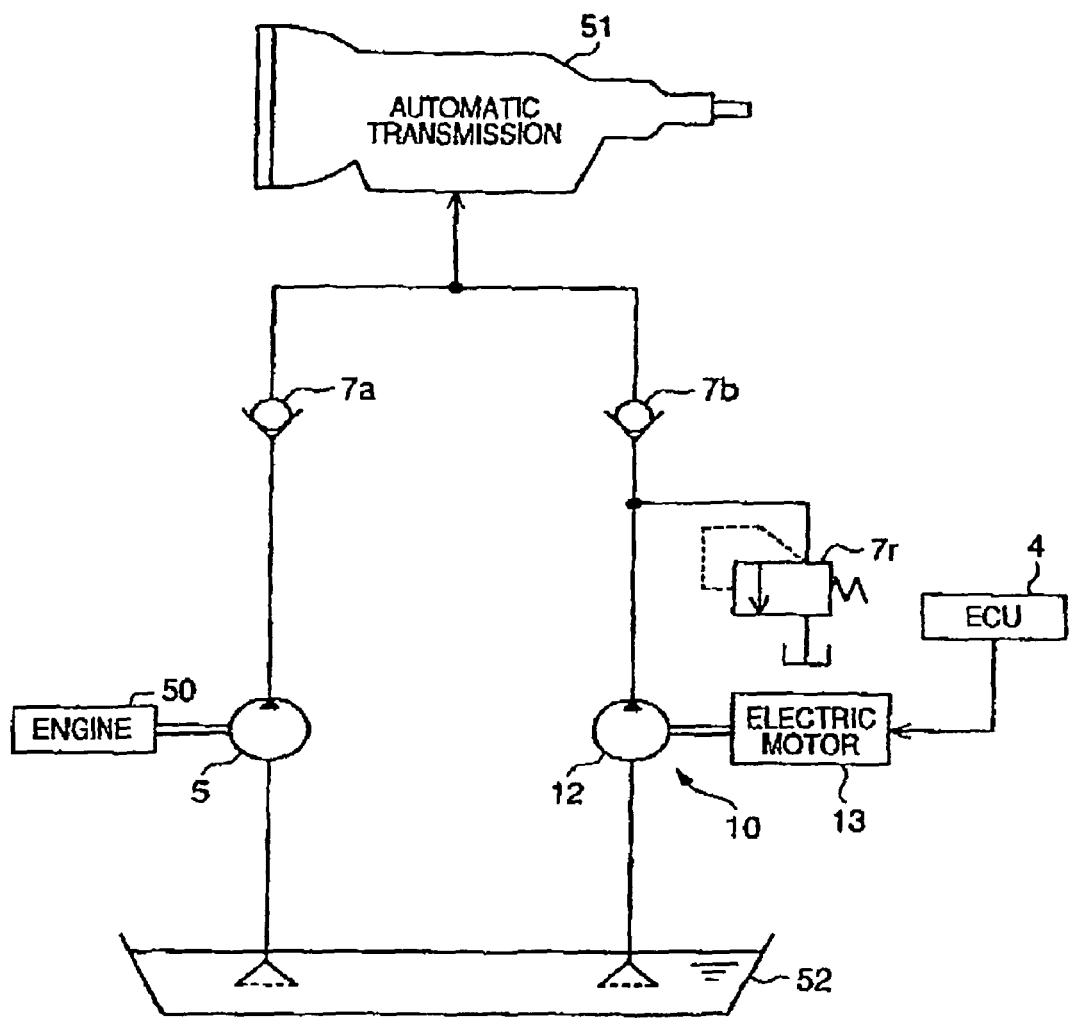
FIG. 6 is a hydraulic circuit diagram of an oil pump system for a vehicle in accordance with a conventional example.

The oil pump system for a vehicle in accordance with this embodiment is configured as described above, and to give a more specific description of its operation with reference to FIG. 5, the discharge rate Q of the hydraulic fluid by the vane pump (hydraulic pump) 2 becomes greater substantially in proportion to the number of revolution of the engine 50, i.e., an engine speed N ($\min^{-1}$).

Here, in the conventional art, as described in the background art, at the point of time when the automobile is started by starting again the rotation of the engine 50 from an idling stop state, the rotor 21 does not rotate in the vane pump 2, and the vanes 23 are in a state of being not in contact with the cam surface 24s of the cam ring 24. For this reason, there occurred an engine rotation range (the range of the engine speed N=0 to No ($\min^{-1}$) in FIG. 5) where the hydraulic pressure of the hydraulic fluid supplied from the vane pump 2 to the automatic transmission 51 is insufficient.

In contrast, in this embodiment, as described before, during an idling stop of the automobile, the hydraulic fluid is fed with pressure to the vane accommodating grooves 22 of the vane pump 2 by the operation of the electric power-driven oil pump 1 assisting the hydraulic pressure of the automatic transmission 51 during the idling stop, so that the vanes 23 are projected radially outward and are pressed against the cam surface 24s at the inner surface of the cam ring 24. For this reason, in a rotation range of the engine 50 at an idling speed Na or below, as the number of revolution of the electric motor 13 is controlled by the ECU 4, a total discharge rate QT=(Qa+Qb) ($m^3$/min), which is a total of a discharge rate Qa ($m^3$/min) of the vane pump 2 and a discharge rate (auxiliary flow rate) Qb ($m^3$/min) of the electric power-driven oil pump 1, is enabled to become a fixed rate irrespective of the engine speed N.

Thus, according to the oil pump system for a vehicle in accordance with this embodiment, it is possible to obtain the following operation and effects.

(1) During an idling stop of the automobile, the hydraulic fluid is fed with pressure to the vane accommodating grooves 22 accommodating the vanes 23 in the vane pump 2, which serves as the hydraulic pump, by the operation of the electric power-driven oil pump 1 assisting the hydraulic pressure of the automatic transmission 51 during the idling stop, so that the vanes 23 are projected and are pressed against the cam surface 24s at the inner surface of the cam ring 24. For this reason, immediately upon the start of the engine 50, i.e., the start of the vane pump 2, the low-pressure portions 24L and the high-pressure portions 24H are formed in the pump chambers 24c between the outer periphery of the rotor 21 and the cam surface 24s, so that the hydraulic fluid is fed with pressure to the automatic transmission 51.

(2) The check valve 7c, which opens when the hydraulic pressure of the hydraulic fluid delivered from the electric power-driven oil pump 1 exceeds the hydraulic pressure of the hydraulic fluid in the vane accommodating grooves 22, is interposed in the communication oil passage 6 allowing the discharge portion of the electric power-driven oil pump 1 and the vane accommodating grooves 22 in the vane pump 2 to communicate with each other. For this reason, the check valve 7c is closed by a simple configuration when the hydraulic pressure of the hydraulic fluid in the vane accommodating grooves 22 exceeds the hydraulic pressure of the hydraulic fluid delivered from the electric power-driven oil pump 1. This avoids the trouble that, for example, a hindrance is caused to the rotation of the rotor 21 in a case where the vane accommodating grooves 22 have assumed an overpressure state, and the pressing force with which the vanes 23 press the cam surface 24s has become excessively large.

(3) Since the electric power-driven oil pump 1 consists of the internal gear pump 12 and the electric motor 13 for rotationally driving the pump 12, it is possible to realize an oil pump system for a vehicle which excels in the constant flow rate characteristic and in which the pulsation is small, with the result that the noise during operation is small.

It should be noted that the above-described embodiment may be modified as follows.

Although in the above-described embodiment the electric power-driven oil pump 1 is comprised of the internal gear pump 12 and the electric motor 13 for rotationally driving the pump 12, another type of pump, e.g., an external gear pump, maybe used instead of the internal gear pump 12.

Although in the above-described embodiment the communication oil passage 6 allowing the discharge side of the electric power-driven oil pump 1 and the vane accommodating grooves 22 of the vane pump 2 to communicate with each other is configured as the oil passage 6a on the discharge side of the electric power-driven pump 1 as well as the annular hollow portion 27r and the communication port 27p both formed in the end plate 27 are communicated with each other. However, the invention is not limited to the same, and the communication oil passage 6 may be configured by the oil passage 6a on the discharge side of the electric power-driven pump 1 and an oil passage of another shape formed in the end plate 27. Still alternatively, the communication oil passage 6 may, of course, be configured by the oil passage 6a on the discharge side of the electric power-driven pump 1 and an oil passage provided in a member other than the end plate 27 by disposing the member in such a manner as to be contiguous to the rotor 21.

Further, a description will be given below of technological concepts which can be grasped from the embodiment and modifications described above.

The oil pump system for a vehicle according to the second aspect of the invention, wherein the communication oil passage is configured as an oil passage on the discharge side of the electric power-driven pump, an annular hollow portion communicating with inside-diameter side end portions of the vane accommodating grooves, and a communication port connecting the annular hollow portion and the outside are communicated with each other, both the annular hollow portion and the communication port being formed in an end plate for closing from one end side a space for accommodating the cam ring.

According to the above-described configuration, since the communication oil passage is formed in the end plate for closing from one end side the space for mainly accommodating the cam ring, it is possible to realize with a simple structure the fabrication of the communication oil passage which is essential for pressing the vanes against the cam surface with the vane accommodating grooves set in a pressurized state when the rotation of the engine is started again from an idling stop state. Furthermore, it becomes possible to uniformly apply the hydraulic pressure to the vane accommodating grooves by virtue of the annular hollow portion communicating with the inside-diameter side end portions of the vane accommodating grooves.

The oil pump system for a vehicle according to the third aspect of the invention, wherein the number of revolution of the electric motor is controlled by the controller, and, in a rotation range of the engine at an idling speed or below, a total discharge rate, which is a total of a discharge rate of the vane pump and a discharge rate of the electric power-driven oil pump, is set to a fixed rate.

According to the above-described configuration, the vane pump as the hydraulic pump serving as a hydraulic power source of an automatic transmission of the automobile can be made a compact hydraulic pump with a smaller discharge rate. This makes it possible to minimize the energy loss in the engine rotation range at the idling speed or below, as compared with a case where a conventional large-sized hydraulic pump is used

What is claimed is:

1. An oil pump system for a vehicle, the oil pump system comprising:
    a vane pump including a plurality of vanes which respectively project retractably from a plurality of vane accommodating grooves provided in a rotor so as to be brought into sliding contact with a cam surface, low-pressure portions for sucking a hydraulic fluid from an outside and high-pressure portions for discharging the hydraulic fluid to the outside being adapted to be produced in pump chambers formed by the plurality of vanes between the cam surface and the rotor by the rotation of the rotor so as to supply the hydraulic fluid to a transmission of a vehicle, in order to serve as a hydraulic power source for the transmission of the vehicle;
    an electric power-driven oil pump for assisting hydraulic pressure of the hydraulic fluid during an idling stop of the vehicle; and
    a controller for controlling an operation of the electric power-driven oil pump,
    wherein, during the idling stop of the vehicle, the hydraulic fluid is fed to the transmission by the operation of the electric power-driven oil pump to assist the hydraulic pressure, while the hydraulic fluid is fed with pressure to the vane accommodating grooves to press the vanes against the cam surface,
    wherein the controller is configured such that a total discharge rate, which is a total of a discharge rate of the vane pump and a discharge rate of the electric power-driven oil pump, is set to a fixed rate in a rotation range of an engine of the vehicle at an idling speed or below, and
    wherein a communication oil passage is provided for allowing a discharge side of the electric power-driven oil pump and the vane accommodating grooves of the vane pump to communicate with each other, and a check valve is interposed in the communication oil passage, the check valve being opened when the hydraulic pressure of the hydraulic fluid delivered from the electric power-driven oil pump exceeds the hydraulic pressure of the hydraulic fluid in the vane accommodating grooves.

2. The oil pump system according to claim 1, wherein the electric power-driven oil pump includes an internal gear pump and an electric motor for rotationally driving the internal gear pump, and a number of revolutions of the electric motor is controlled by the controller.

3. The oil pump system according to claim 2, wherein a number of revolutions of the electric motor is controlled by the controller.

4. The oil pump system according to claim 1, wherein the communication oil passage is configured as an oil passage on the discharge side of the electric power-driven pump, an annular hollow portion communicating with inside-diameter side end portions of the vane accommodating grooves, and a communication port connecting the annular hollow portion and the outside such that the annular hollow portion communicates with the outside, and
    wherein the annular hollow portion and the communication port are formed in an end plate for closing a space for accommodating a cam ring from one end side.

5. The oil pump system according to claim 1, wherein the electric power-driven oil pump feeds the hydraulic fluid with pressure to the vane accommodating grooves to press the vanes against the cam surface when the rotor of the vane pump is stationary.

6. The oil pump system according to claim 1, wherein the communication oil passage communicates the hydraulic fluid from the discharge side of the electric power-driven oil pump to the vane accommodating grooves.

7. The oil pump system according to claim 1, wherein the idling stop of the vehicle comprises a state in which the rotor of the vane pump is stationary.

8. The oil pump system according to claim 1, further comprising a second check valve disposed between the electric power-driven oil pump and the transmission of the vehicle such that the check valve interposed in the communication oil passage is not in series with the second check valve.

9. The oil pump system according to claim 1, wherein the hydraulic fluid is fed with pressure to the vane accommodating grooves to press the vanes against the cam surface prior to rotation of the rotor of the vane pump.

10. The oil pump system according to claim 1, wherein the communication oil passage is formed in an end plate on an end of the vane pump.

* * * * *